June 2, 1964  R. F. HINDERER  3,135,715
RUBBER ELECTRIC INSULATION
Filed March 17, 1960
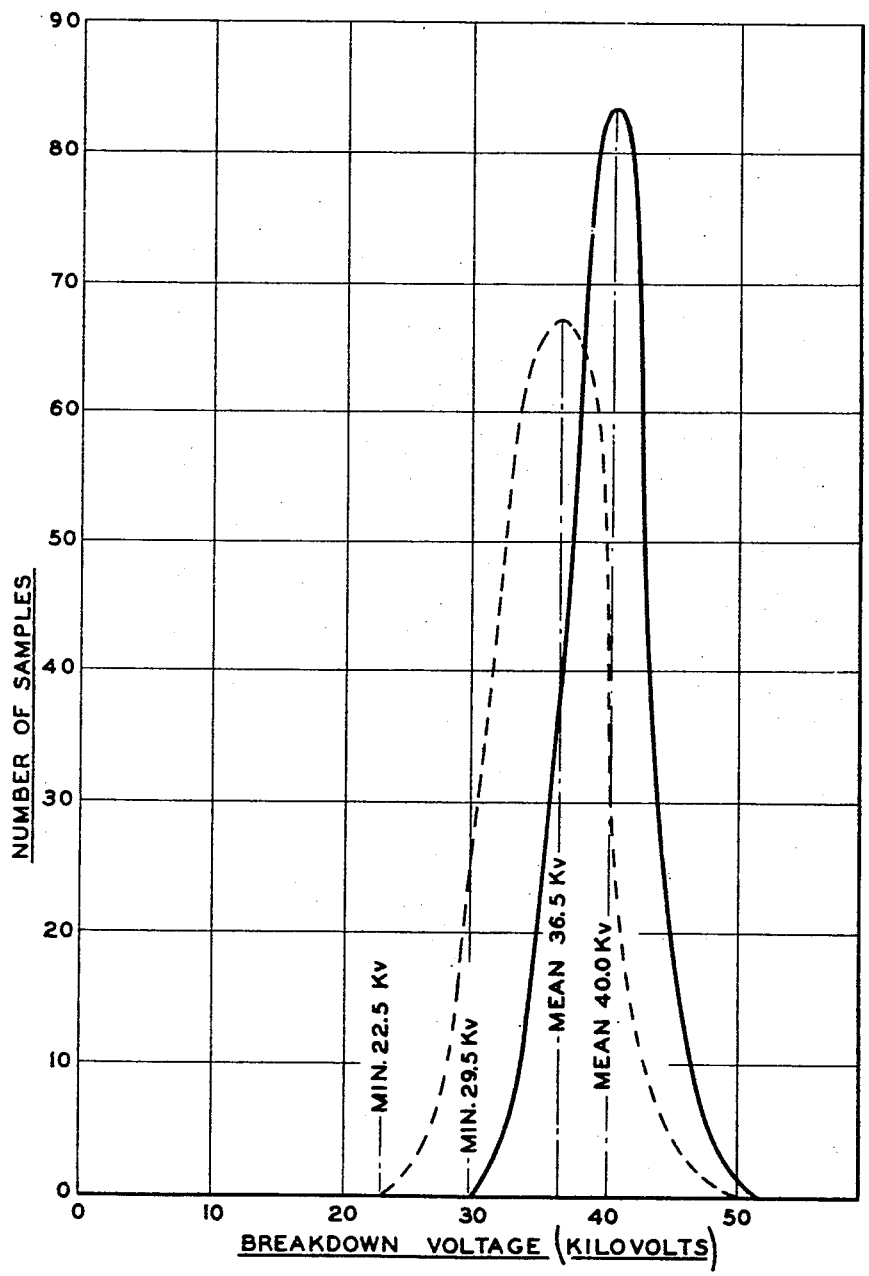
INVENTOR
ROBERT F. HINDERER
BY
ATTORNEYS

United States Patent Office 3,135,715
Patented June 2, 1964

3,135,715
RUBBER ELECTRIC INSULATION
Robert F. Hinderer, Marion, Ind., assignor, by mesne assignments, to Wireco, Inc., a corporation of Delaware
Filed Mar. 17, 1960, Ser. No. 15,596
11 Claims. (Cl. 260—41.5)

This invention relates to rubber electric insulation, especially for power cables, and has for its object to provide an improved rubber insulation characterized by notable superiority over heretofore known rubber insulation in both the uniformity and magnitude of its ability to withstand breakdown under applied voltage stress. The invention provides a method of making the new rubber insulation, and power cables insulated with it. The improved properties of the new rubber insulation are associated with the fineness of the individual particles and agglomerates of particles of the fillers incorporated in the rubber stock. Improved rubber insulation according to the invention is characterized by containing no filler particles or agglomerates exceeding 2 mils (0.002 inch, or 0.05 mm.) in maximum dimension.

The use of rubber compositions for electric insulation is both old and extensive. Natural rubber compositions were among the first insulating materials used on a large scale; and virtually all synthetic rubbers have, as they have been developed, been used as a base for electrically insulating material. In general, however, the mechanical and chemical properties of rubber compositions have been responsible more than their dielectric properties for their widespread use as electrical insulating materials. The flexibility, toughness, moisture resistance, resistance to abrasion, and like properties, make rubber compositions eminently suitable for insulating electrical conductors that are subject to hard usage or mechanical abuse. The dielectric properties of rubber compositions, have long been recognized to be inferior to other dielectric materials. Where reliably high dielectric strength or notable uniformity in dielectric properties have been of major significance, other materials than rubber have been chosen as the insulating material.

In the course of an extensive investigation of factors influencing the magnitude and uniformity of dielectric strength of rubber insulation compositions, I have observed a statistical correlation between the fineness with which filler particles are dispersed in the rubber stock and the excellence of the dielectric properties. Rubber insulation compositions in which no individual filler particles or agglomerates exceed 2 mils in maximum dimension in general display both higher minimum and higher average dielectric strengths and greater uniformity in dielectric properties than rubber compositions in which occasional particles or particle agglomerates are substantially larger than the mean size of the individual particles of the coarsest filler used. The mean particle size of mineral fillers customarily employed in compounding rubber insulations is generally under 2 mils, and in a typical case may be about 0.5 mil.

Rubber insulation compositions according to the invention comprise filler particles intimately dispersed throughout a cured rubber stock, and are free of filler particles or agglomerates exceeding 2 mils in maximum dimension. In consequence of this fineness of the dispersion of filler particles, the insulation composition is characterized by significantly higher and more uniform dielectric strength than is an insulation of identical composition containing a substantial proportion (even as much as 1% or a fraction of 1% by weight of the fillers) of particles or particle agglomerates exceeding 2 mils in maximum dimension. A statistically significant number of samples of an insulation composition according to the invention will be found upon test to be subject to electrical breakdown only at notably higher minimum and mean breakdown dimensions than will be the case with a statistically significant number of samples of an insulation of identical composition but containing a substantial proportion of particles or particle agglomerates exceeding 2 mils in maximum dimension.

Rubber insulation compositions, like rubber compositions for other purposes, are prepared by milling together the desired rubber polymer stock, the desired fillers, and the desired processing and vulcanizing aids. It has been customary heretofore in the compounding of rubber insulations to add each filler from a separate supply source along with the rubber polymer stock to mixing or blending apparatus by which these ingredients are blended into a substantially uniform mix, and subsequently to mill in the vulcanizing aids. This procedure as carried out conventionally in the commercial manufacture of rubber insulation will not preclude tne occurrence of substantial numbers of particles or particle agglomerates substantially exceeding the mean size of the individual filler particle. When, as is usually the case in compounding rubber electric insulation, a large proportion of the fillers are mineral materials of particle size approaching or exceeding 1 mil in maximum dimension, a substantial number of filler particles or agglomerates exceeding 2 mils in maximum dimension are present in the composition thus produced. Rubber insulation compositions thus produced possess the relative lack of uniformity of dielectric strength, and the relative low average dielectric strength, which differentiates rubber insulation compositions heretofore known from the compositions of this invention. To produce the new and improved rubber insulation compositions, the method of the invention involves intimately blending and milling together, in pulverulent solid form, substantially all of the fillers to be incorporated in the rubber insulation composition, and drying the pulverulent solid fillers by heating them in the course of such blending and milling to a temperature at least substantially as high as the boiling temperature of water at the prevailing pressure. Preferably, during the blending and milling operations, the pulverulent solid fillers are dried by subjecting them to a subatmospheric pressure and to a temperature above about 200° F. After thus thoroughly preblending and drying the dry pulverulent solid fillers, they are blended with the desired rubber stock and with processing and vulcanizing agents by conventional mixing procedures, and thereby a composition substantially free of filler agglomerates or particles exceeding 2 mils in maximum dimension is formed.

The invention contemplates rubber-insulated power cables having an insulating layer of the rubber insulation composition of the invention; and it contemplates a method of making such power cable by extruding or otherwise applying the mixture of preblended fillers, rubber stock, and processing and vulcanizing aids about a conductor and curing the composition on the conductor.

Following is a description of a presently preferred embodiment of the invention as applied to the manufacture of rubber-insulated power cable. In the course of the following description reference is made to the accompanying drawing, the single figure of which is a plot showing the distribution over a statically significant number of samples of the voltage at which electrical breakdown occurred in power cables insulated with a layer of rubber insulation composition according to the invention, in comparison with the distribution over a statistically significant number of samples of the voltage at which breakdown occurred in a similar cable insulated with a rubber of identical composition which was compounded by heretofore conventional procedures.

Fillers customarily employed in the compounding of rubber insulation compositions comprise, among others, carbon black and whiting. For example, on the basis of the fillers alone, a mixture comprising from 1% to 10% by weight of carbon black and from 60% to 99% by weight of whiting may be employed. Often other fillers, such as zinc oxide (say from 1% to 10%), also are included; and pigments, which for purposes of this invention may be treated as fillers, likewise are often present.

Of the various available rubber stocks, both natural and synthetic, butyl rubber (the copolymer of isobutylene with 1.5% to 4.5% of isoprene) is generally preferred for electrically insulating rubber compositions. The following description of the invention is directed to the manufacture of a power cable insulated with a rubber composition falling within the following composition elements (though of course the invention is not limited to such compositions):

| Ingredient: | Percent by weight of composition |
|---|---|
| Butyl rubber copolymer | 30 to 55 |
| Polyethylene | 0 to 15 |
| Whiting (natural calcium carbonate) | 30 to 45 |
| Zinc oxide | 2 to 10 |
| Carbon black | 1 to 5 |
| Zinc stearate | 1 to 5 |
| Anti-oxidant | 0 to 2 |
| Vulcanizing agents | 1 to 2.5 |
| Accelerators | 1 to 4 |

The foregoing ingredients normally are separately purchased and stored. For purposes of preparing rubber insulation compositions according to the invention, a preblend of the fillers is first prepared and thoroughly dried. To this end, weighed quantities in the desired proportions of carbon black, whiting, zinc oxide, and any other desired dry pulverulent fillers or pigments, are introduced into suitable mixing and blending apparatus. The individual particle size of commercial carbon black is exceedingly fine, being generally no more than a few microns in maximum dimension. The particle size of commercial zinc oxide also is exceedingly small, although somewhat larger than that of carbon black. Finely ground whiting of commerce is the coarsest of the fillers used. The maximum size of its particles, however, should be less than 2 mils, and the mean size of the whiting particles (that is the maximum dimension of particles of mean size) generally is no more than about 0.5 mil. Any pigments or other fillers used should have particle sizes no larger than those indicated for whiting.

Any suitable mixing apparatus may be used. Particularly satisfactory results have been employed using an enclosed ribbon blender which may be evacuated and which is equipped with a steam heating jacket. After charging the dry pulverulent solids into such apparatus, the air pressure within it is reduced substantially, say to one-half atmosphere or less. Concurrently, the charge is heated to a temperature at least equal to the boiling temperature of water at the prevailing pressure, and preferably to a temperature of 200° F. or higher. The dry solids are thoroughly blended and mixed while thus heated at reduced pressure, with the result that they are intimately mixed together and thoroughly dried.

The resulting intimate mix of dried filler particles is discharged into a suitable storage vessel, where it is held until required for admixing with the rubber polymer stock. The storage vessel should be kept closed to prevent pickup of moisture by the filler particles from the atmosphere.

Next, the filler particles are thoroughly mixed with the desired rubber polymer stock. Such mixing may be carried out in accordance with conventional rubber compounding practice. For example, suitable proportions of preblended fillers, rubber polymer, polyethylene (if used) and processing aids (e.g. zinc stearate, hydrocarbon oil or wax, etc.), are charged into a Banbury mixer. If desired, the preblended fillers may be delivered directly to such mixer from the preblending apparatus, rather than through an intermediate storage vessel. The several ingredients are thoroughly mixed to form the desired rubber composition. Especially satisfactory results are achieved by operating the Banbury mixer at high pressure and high speed, heating the composition during mixing to a temperature above 300° F. and preferably near 350° F. Under such conditions the mixing time will generally be about 4 to 5 minutes. Mixing under conditions which involve heating to such relatively high temperature helps assure that no filler particles or agglomerates exceeding 2 mils in maximum dimension will be present in the finished composition.

The hot mixed rubber composition upon discharge from the mixer preferably is passed through a fine mesh screen to insure freedom from lumpy aggregates. A screen size fine enough to insure thorough breakdown of the mixed composition should be employed. For this purpose an 80-mesh screen has been found satisfactory.

The strained mixed composition is then handled in accordance with conventional practice. If, as is generally the case, it as yet contains no vulcanizing agents or accelerators, it may be sheeted and slit into ribbons which are coiled and held for future use. The coiled stock is subsequently milled with added vulcanizing agents and accelerators preparatory to fabrication into desired final form. When the vulcanizing agents and accelerators have been incorporated, the mix should be fabricated and cured without delay.

In the manufacture of a rubber-insulated power cable, the rubber composition containing vulcanizing agents and accelerators is extruded or otherwise applied about a metallic conductor, using conventional extrusion apparatus for the purpose. The resulting rubber covered conductor then is introduced into conventional vulcanizing apparatus, wherein it is heated, preferably under pressure, for a sufficient period of time to cure the rubber polymer.

The resulting cured layer of rubber insulation on the cable is free from particles or particle agglomerates exceeding 2 mils in maximum dimension, and is remarkably uniform in its dielectric properties. Moreover, its mean dielectric strength is markedly higher than identical rubber insulation compositions as heretofore known, which generally contain, scattered throughout the insulation mass, an appreciable number of filler particles or agglomerates substantially upwards of 2 mils in minimum dimension. Surprisingly enough, the proportion of such relatively large particles can be quite small and yet be associated with a notably less uniform and lower mean dielectric strength on the part of the rubber composition. Indeed, the best rubber insulations heretofore prepared in general contain only a fraction of one percent of the filler particles in the form of relatively coarse lumps or agglomerates exceeding 2 mils in maximum dimension. But rubber insulating compositions from which these relatively coarse filler particles or agglomerates have been eliminated, as is contemplated by the invention, exhibit a marked improvement in dielectric properties.

The accompanying drawing is a statistical plot showing the marked improvement in dielectric strength obtained in rubber insulating compositions in accordance with the invention. Each curve shows the distribution of breakdown strength determinations made on a large statistically significant number of samples of electrical power cable insulated with a rubber composition $19/64$ inch in thickness. The dotted curve shows the distribution of breakdown strengths as determined on samples of a power cable insulated with a conventional or "old style" rubber composition, prepared by heretofore conventional means, containing a small but readily discerned proportion of its filler in the form of particles or agglomerates exceeding 2 mils in maximum dimension. The solid-line curve shows the corresponding distribution of breakdown strengths as determined on samples of a power cable insulated with an identical rubber composition, but of "new style" prepared in accordance with the invention so as to be free of filler particles or agglomerates exceeding 2 mils in maximum dimension.

The curves clearly bring out the three notable improvements which are attained in accordance with the invention. First, the relatively great breadth of the dotted curve at its base and at all heights above its base, in comparison with the solid curve, clearly displays the greater lack of uniformity in dielectric strength of the "old style" insulation than the "new style" insulation. Second, the minimum breakdown strength found for the "old style" insulation (22.5 kilovolts) is approximately 25% lower than the minimum breakdown strength (29.5) found for the "new style" insulation. Third, the mean breakdown strength for the "new style" insulation (40.0 kilovolts) is some 10% higher than the mean breakdown strength (36.5 kilovolts) found for the "old style" insulation. The curves thus show that on a statistical basis, the minimum breakdown strength for the "new style" insulation is approximately 700 volts per 1/64 inch of thickness higher than for "old style" rubber insulation; and the mean dielectric strength for the "new style" rubber insulation exceeds by some 350 volts per 1/64 inch of thickness the minimum dielectric strength of the corresponding "old style" product.

As indicated by the curves, the "new style" rubber insulation is not significantly superior in dielectric strength to the very best "old style" corresponding rubber insulation of identical composition. For both materials, the maximum breakdown strength was about 51 kilovolts for the 10/64 inch of insulation thickness. This figure, however, is not of practical significance. The safe operation of electric power cables is determined by the minimum, not the maximum, voltage at which it is likely to fail. The markedly higher minimum breakdown voltage and the significantly greater uniformity in dielectric strength of the "new style" insulation as compared with "old style" rubber insulation of identical composition permits safe rating of power cables insulated with the "new style" material for operation at a higher voltage per mil of insulation thickness than has been possible heretofore, or, alternatively, reducing the thickness of the insulation for safe operation at a given voltage rating.

I claim:

1. The method of making power cable having rubber insulation in which filler particles are finely dispersed and which displays uniformly high dielectric strength, which comprises intimately blending and milling together in pulverulent solid form substantially all of the fillers to be incorporated in said rubber insulation, drying the pulverulent solid fillers by heating them in the course of such blending and milling to a temperature at least substantially as high as the boiling temperature of water at the prevailing pressure, thereafter preparing a rubber insulating composition by intimately mixing the blended and dried pulverulent fillers with rubber stock and with processing and vulcanizing agents, whereby a composition substantially free of filler agglomerates or particles exceeding 2 mils in maximum dimension is formed, applying said insulating composition as an insulating layer to a conductor, and curing the composition on the conductor.

2. The method of making power cable having rubber insulation in which filler particles are finely dispersed and which displays uniformly high dielectric strength, which comprises intimately blending and milling together in pulverulent solid form substantially all of the fillers to be incorporated in said rubber insulation, drying the pulverulent solid fillers by subjecting them in the course of such blending and milling to a subatmospheric pressure and to a temperature at least substantially as high as the boiling temperature of water at such pressure, thereafter preparing a rubber insulating composition by intimately mixing the blended and dried pulverulent fillers with rubber stock and with processing and vulcanizing agents, whereby a composition substantially free of filler agglomerates or particles exceeding 2 mils in maximum dimension is formed, applying said insulating composition as an insulating layer to a conductor, and curing the composition on the conductor.

3. The method of making power cable having rubber insulation in which filler particles are finely dispersed and which displays uniformly high dielectric strength, which comprises intimately blending and milling together in pulverulent solid form substantially all of the fillers to be incorporated in said rubber insulation, drying the pulverulent solid fillers by subjecting them to a subatmospheric pressure and heating them to a temperature above about 200° F. in the course of such blending and milling operation, thereafter preparing a rubber insulating composition by intimately mixing the blended and dried pulverulent fillers with rubber stock and with processing and vulcanizing agents, whereby a composition substantially free of filler agglomerates or particles exceeding 2 mils in maximum dimension is formed, applying said insulating composition as an insulating layer to a conductor, and curing the composition on the conductor.

4. The method of making power cable having rubber insulation in which filler particles are finely dispersed and which displays uniformly high dielectric strength, which comprises intimately blending and milling together in pulverulent solid form a mixture of fillers comprising finely pulverulent solid carbon black and whiting, drying the filler mixture by heating it in the course of such blending and milling to a temperature at least substantially as high as the boiling temperature of water at the prevailing pressure, thereafter preparing a rubber insulating composition by intimately mixing the blended and dried pulverulent fillers with rubber stock and with processing and vulcanizing agents, whereby a composition substantially free of filler agglomerates or particles exceeding 2 mils in maximum dimension is formed, applying said insulating composition as an insulating layer to a conductor, and curing the composition on the conductor.

5. The method of making power cable having rubber insulation in which filler particles are finely dispersed and which displays uniformly high dielectric strength, which comprises intimately blending and milling together in pulverulent solid form a mixture of fillers comprising from 1% to 10% by weight of carbon black and from 60% to 99% by weight of whiting in solid pulverulent form, drying said mixture by subjecting it to a subatmospheric temperature and heating it to a temperature above about 200° F. in the course of such blending and milling, thereafter preparing a rubber insulating composition by intimately mixing the blended and dried pulverulent fillers with butyl rubber stock and with processing and vlucanizing agents, whereby a composition substantially free of filler agglomerates or particles exceeding 2 mils in maximum dimension is formed, applying said insulating composition as an insulating layer to a conductor, and curing the composition on the conductor.

6. Rubber-insulated power cable comprising a conductor surrounded by a layer of rubber insulation, said insulation comprising filler particles intimately dispersed throughout cured rubber stock and being free of filler particle agglomerates exceeding 2 mils in maximum dimension, said insulation being characterized by significantly higher and more uniform dielectric strength than an insulation of identical composition containing a substantial proportion of particle agglomerates exceeding 2 mils in maximum dimension.

7. Rubber-insulated power cable comprising a conductor surrounded by a layer of rubber insulation, said insulation comprising filler particles intimately dispersed throughout cured rubber stock and being free of filler particle agglomerates exceeding 2 mils in maximum dimension, a statistically significant number of samples of such cable being subject to electrical breakdown only at notably higher minimum and mean breakdown voltages than a statistically significant number of samples of cable having insulation of identical composition but containing a substantial proportion of particle agglomerates exceeding 2 mils in maximum dimension.

8. Rubber-insulated power cable comprising a conductor surrounded by a layer of rubber insulation, said insulation comprising filler particles of carbon black and whiting intimately dispersed throughout a cured rubber stock and being free of filler particle agglomerates exceeding two mils in maximum dimension, said insulation being characterized by significantly higher and more uniform dielectric strength than an insulation of identical composition containing a substantial proportion of particle agglomerates exceeding 2 mils in maximum dimension.

9. Rubber-insulated power cable comprising a conductor surrounded by a layer of rubber insulation, said insulation comprising filler particles of carbon black and whiting intimately dispersed throughout a cured butyl rubber stock and being free of filler particle agglomerates exceeding 2 mils in maximum dimension, a statistically significant number of samples of such cable being subject to electrical breakdown only at minimum and mean breakdown voltages exceeding by at least 700 volts and 350 volts per 1/64 inch of insulation thickness respectively the corresponding breakdown voltages of a statistically significant number of samples of cable having insulation of identical composition but containing a substantial proportion of particle agglomerates exceeding 2 mils in maximum dimension.

10. A rubber insulation composition comprising filler particles intimately dispersed throughout a cured rubber stock and being free of filler particle agglomerates exceeding 2 mils in maximum dimension, said insulation composition being characterized by significantly higher and more uniform dielectric strength than an insulation of identical composition containing a substantial proportion of particle agglomerates exceeding 2 mils in maximum dimension.

11. A rubber insulation comprising filler particles of carbon black and whiting intimately dispersed throughout a cured butyl rubber stock and being free of filler particle agglomerates exceeding 2 mils in maximum dimension, a statistically significant number of samples of such insulation being subject to electrical breakdown only at minimum and mean breakdown voltages exceeding by at least 700 volts and 350 volts per 1/64 inch of insulation thickness respectively the corresponding breakdown voltages of a statistically significant number of samples of insulation of identical composition but containing a substantial proportion of particle agglomerates exceeding 2 mils in maximum dimension.

References Cited in the file of this patent

UNITED STATES PATENTS

| | | |
|---|---|---|
| 2,096,933 | Burgess | Oct. 26, 1937 |
| 2,146,594 | Savage et al. | Feb. 7, 1939 |
| 2,558,929 | Bunish et al. | July 3, 1951 |
| 2,689,841 | Augustin | Sept. 21, 1954 |
| 3,024,092 | Gessler | Mar. 6, 1962 |

OTHER REFERENCES

Parkinson: "Transactions Instit. of the Rubber Industry," volume 19, No. 4, December 1943, page 131. (Copy in Div. 50.)

"Compounding Ingredients for Rubber," 2nd edition, October 29, 1947, page 348. (Copy in Div. 50.)

Whitby: Synthetic Rubber, John Wiley & Sons, New York, 1956, pp. 851–853 and pp. 884–885.

Ladoo et al.: Nonmetallic Minerals, McGraw-Hill Book Co., N.Y., 1951, pp. 133–136.

Ford et al.: Industrial and Eng. Chem., vol. 44, April 1952, pp. 819–824.

Sperberg et al: Rubber Age, vol. 67, August 1950, pp. 561–564.

UNITED STATES PATENT OFFICE
CERTIFICATE OF CORRECTION

Patent No. 3,135,715                          June 2, 1964

Robert F. Hinderer

It is hereby certified that error appears in the above numbered patent requiring correction and that the said Letters Patent should read as corrected below.

In the grant, lines 2 and 12, and in the heading to the printed specification, line 4, for "Wireco, Inc.", each occurrence read -- Anaconda Wire and Cable Company --; column 2, line 62, for "statically" read -- statistically --; column 6, line 52, for "vlucanizing" read -- vulcanizing --.

Signed and sealed this 10th day of November 1964.

(SEAL)
Attest:

ERNEST W. SWIDER                         EDWARD J. BRENNER
Attesting Officer                           Commissioner of Patents